United States Patent [19]

Pankratz

[11] Patent Number: 5,415,935

[45] Date of Patent: May 16, 1995

[54] POLYMERIC RELEASE FILM

[75] Inventor: Richard P. Pankratz, Circleville, Ohio

[73] Assignee: E. I. Du Pont de Nemours and Company, Wilmington, Del.

[21] Appl. No.: 860,838

[22] Filed: Mar. 31, 1992

[51] Int. Cl.⁶ .................. B32B 7/12; B32B 27/40; B32B 27/42

[52] U.S. Cl. ................ 428/352; 428/412; 428/423.5; 428/423.7; 428/424.2; 428/425.5; 428/447; 428/448; 428/451; 428/473.5

[58] Field of Search ............ 428/423.5, 423.7, 424.2, 428/425.5, 352, 447, 448, 451, 473.5, 40, 412; 528/28

[56] References Cited

U.S. PATENT DOCUMENTS

| | | | |
|---|---|---|---|
| 4,298,632 | 11/1981 | Schroeter et al. | 427/160 |
| 4,310,600 | 1/1982 | Cross | 428/447 |
| 5,082,704 | 1/1992 | Higgins | 428/40 |
| 5,298,325 | 3/1994 | Culbertson | 428/336 |

FOREIGN PATENT DOCUMENTS

| | | | |
|---|---|---|---|
| 0150772A3 | 8/1985 | European Pat. Off. | C09J 7/02 |
| 0325210 | 1/1989 | European Pat. Off. | B29C 33/64 |
| 0382094A2 | 8/1990 | European Pat. Off. | C09J 163/00 |
| 416765A2 | 3/1991 | European Pat. Off. | . |
| 432886A2 | 6/1991 | European Pat. Off. | . |
| 445744A2 | 9/1991 | European Pat. Off. | . |
| 55-500809 | 10/1980 | Japan | B32B 27/30 |
| 59-20330 | 2/1984 | Japan | B32B 27/00 |
| 59-78240 | 5/1984 | Japan | B32B 27/00 |
| 59-109528 | 6/1984 | Japan | B32B 27/00 |
| 62160957 | 11/1993 | Japan | B32B 27/00 |

OTHER PUBLICATIONS

Abstract of Japanese Publication No. JP1005838, Takahashi Teuro, Published Apr. 26, 1989, Titled "Release Film", Application No. JP870160957 dated Jun. 3, 1987, Group M818, 2 pages.

*Primary Examiner*—D. S. Nakarani

[57] ABSTRACT

A release film comprising in order (a) a polymeric film substrate, (b) a layer containing an organic polymer having reactive segments and polysiloxane segments; and (c) a silicone release layer wherein the adhesion of the silicone release layer to the substrate is improved is described.

4 Claims, No Drawings

POLYMERIC RELEASE FILM

FIELD OF THE INVENTION

This invention relates to a polymeric film with release properties and to a method for the production thereof. More particularly, it relates to a polymeric film substrate with a silicone release layer, in which the adhesion of the silicone release layer to the substrate is improved.

BACKGROUND OF THE INVENTION

Release films have been used in a wide variety of applications. For example, release films are used as protective coversheets for photosensitive materials, as release layers for pressure sensitive adhesives, as temporary supports for decorative decals and stickers, etc. Typically, such release films comprise a polymeric film substrate coated with a silicone release layer. The silicone release layer is generally a coating of a cured, i.e., crosslinked, polysiloxane resin. While such coatings exhibit good release properties, the anchorage of the silicone resin to the polymeric film substrate has been found to be unsatisfactory. In extreme cases, where the silicone composition is cured under conditions of high humidity, the resultant layer is readily removed when rubbed with one's fingers.

The adhesion of the silicone resin to the film substrate is often improved by applying a surface treatment to the substrate prior to coating the silicone resin. Surface treatments which have been used include treatment with a flame or a corona discharge. However, there are variations in the strength of such surface treatments and, therefore, a reliable level of adhesion is not always obtained. In addition, in some cases when the silicone-coated film substrate is stored in the form of a continuous roll, some of the silicone transfers to the backside of the film.

EPO application 416,765 A2 published Mar. 13, 1991, describes a release film comprising a self-supporting, polymeric film substrate having on at least one surface thereof, a polymeric abherent layer wherein the abherent layer comprises a polyurethane resin which is the reaction product of (i) an organic polyisocyanate, (ii) an isocyanate reactive polydialkylsiloxane, and (iii) a polymeric polyol. The abherent layer adheres firmly to the film substrate but provides release from an opposing surface.

It would be desirable to obtain a release film that exhibits reliable and improved adhesion between the substrate and the silicone release layer as well as little or no back transfer of the silicone during storage. These needs are met using the release film of the invention.

SUMMARY OF THE INVENTION

The present invention provides a release film comprising in order:
(A) a polymeric film substrate;
(B) a layer containing an organic polymer having reactive segments and polysiloxane segments; and
(C) a silicone release layer.

In another embodiment, there is provided a process for preparing a release film having the structure described above.

DETAILED DESCRIPTION OF THE INVENTION

Surprisingly and unexpectedly it was found that substantially improved adhesion is obtained using a release film comprising in order (a) a polymeric film substrate (b) a primer layer containing a polymer having reactive segments and polysiloxane segments and (c) a silicone release layer. Adhesion is improved between all three layers, i.e., adhesion is improved between the film substrate and the primer layer and between the primer layer and the overlying silcone release layer.

In preparing the release film of the invention, a polymeric film substrate is first coated with a primer layer, which is then overcoated with a silicone release layer. The primer layer contains a polymer which has both reactive segments and polysiloxane segments. Optionally, the primer layer contains a crosslinking agent which reacts with the polymer in a subsequent hardening or curing step. By the term "silicone release layer" it is meant a layer of an organopolysiloxane, including any of those organopolysiloxane compounds which are known to have low surface energy and low adhesive properties.

Polymeric Film Substrate

The substrate is a dimensionally stable, self-supporting polymeric film which remains stable throughout the processing conditions. The term "self-supporting", as used herein, refers to a film that does not have to be supported by a web or other carrier. Examples of suitable films include cellulosic films and thermoplastic materials such as polyolefins, polyamides, polyimides and polyesters. Linear polyesters are preferred, particularly polyethylene terephthalate (PET). Other linear, semi-crystalline polyester films can also serve as the substrate, including, for example, ethylene glycol polyesters of isophthalic acid, of naphthalenic acid, or of mixtures of terephthalic and naphthalenic and/or isophthalic acids; or polyesters of other glycols, especially of butanediol, 1,4-cyclohexane dimethanol, or mixtures of ethylene glycol with butanediol. For purposes of this invention, the term "film" encompasses films, sheets tapes, disks and similar commercial articles.

The thickness of the film substrate will depend on the intended use of the final release film. Typically, the final release film has a thickness in the range of about 0.25 to about 15 mils (6 to 375 micrometers).

The film substrate can be treated to improve its adhesive properties. Typical adhesion-promoting treatments include flame treatments and corona discharge treatments.

Primer Layer

The polymeric film substrate is coated with a composition which comprises an organic polymer having reactive segments and polysiloxane segments.

The polymer having reactive segments and polysiloxane segments is generally a block copolymer. The reactive and/or polysiloxane segments can be present in the polymer backbone or in the form of pendant groups. The reactive segment contains groups capable of reacting with the crosslinking agent and provides much of the adhesive function for the primer layer. Examples of suitable reactive functional groups include, but are not limited to, carboxyl, hydroxyl, amine, amide, or oxirane groups. Examples of polymers which can be used as the reactive segment include polycarbonates; polymers and copolymers of unsaturated acids and anhydrides, such as acrylic acid, methacrylic acid, maleic anhydride and highly carboxylated polyolefins; polyvinyl alcohol and partially hydrolyzed polyvinyl acetate; hydroxy or amino substituted polyacrylates and polymethacrylates; polyacrylamide; and epoxy polymers. The reactive segment can also be incorporated as a polymeric side chain on, for example, a polyolefin or vinyl polymer. The reactive groups generally comprise about 0.01 to 5.0% by weight, based on the total weight of the reactive segment, although higher levels can be used.

The polysiloxane segment can be a part of the polymer backbone or a polymeric side chain. The polysiloxane is preferably a polydialkylsiloxane in which the alkyl group has from 1 to 6 carbon atoms. Particularly preferred is polydimethylsiloxane.

The organic polymer and the different segments are prepared by polymerization techniques which are well known in the art. The polysiloxane segment generally comprises from about 10 to 90% by weight of the polymer, preferably 30 to 70%, by weight.

A particularly preferred polymer is the reaction product of a polycarbonate polyol, an organic polyisocyanate, and an isocyanate-reactive polydialkylsiloxane.

In a preferred mode, the primer layer is a thermally hardened layer which is the reaction product of (i) an organic polymer having reactive segments and polysiloxane segments, (ii) a crosslinking agent and (iii) a catalyst.

The crosslinking agent is a polyfunctional compound which will react with the reactive segments of the organic polymer in a hardening or curing step. Examples of suitable crosslinking agents include melamine-formaldehyde, urea-formaldehyde, benzoguanamine-formaldehyde, glycoluril-formaldehyde, epoxy and aziridine resins. A preferred crosslinking agent is melamine-formaldehyde resin. The resin is used in an amount of about 1–25% by weight, based on the weight of the organic polymer.

The catalyst functions to accelerate the crosslinking reaction. Preferred catalysts for crosslinking most formaldehyde based resins include ammonium sulfate, ammonium chloride, ammonium nitrate, ammonium thiocyanate, ammonium dihydrogen phosphate, diammonium hydrogen phosphate, para-toluene sulfonic acid, sulfuric acid, maleic acid stabilized by reaction with a base, ammonium para-toluene sulfonate and morpholinium para-toluene sulfonate. The catalyst is generally present in an amount of about 1–20% by weight based on the weight of the crosslinking agent.

The primer layer composition can also contain other additives as long as they do not interfere with the adhesive properties of the coating. Examples of additives which may be present include wetting agents, rheology control agents, solubility aids, surfactants, and the like. It is preferred that the primer composition include a surfactant, e.g., sodium lauryl sulfate, sodium salt of dioctyl sulfosuccinate, nonylphenol polyethylene glycol ethers and ammonium lauryl ether sulfates.

The primer layer composition can be applied from a solvent or aqueous carrier. It is preferred that the primer be applied as an aqueous emulsion to the polymeric film substrate. The emulsion is prepared using standard techniques which are well known.

The primer layer composition can be applied to the substrate during or after film manufacture. The primer can be coated onto the film substrate in the form of a solution, dispersion or emulsion, using any conventional coating process. In a preferred process, the primer is in the form of an aqueous emulsion, and is coated onto an unstretched or uniaxially or biaxially stretched polyester film, especially PET. This can be accomplished, for example, by passing the polyester film through a bath of the primer emulsion, i.e., coating the primer layer on both sides of the polymeric film substrate, or by applying the emulsion to one side only with a roller or a brush. The coated material is then dried, and the coated film is stretched, if desired, and heated to a sufficient temperature to promote crosslinking of the organic polymer with the crosslinking agent. Typically, a temperature of from about 150° to 250° C. is used for curing. If the coating is applied to an unstretched film, or unidirectionally stretched film, the film can be stretched following the coating step without loss of the mechanical integrity of the coating and then heated to a sufficient temperature to promote crosslinking. For best results, the thickness of the primer layer, after drying and stretching, should be about 0.01 to 1.0 micrometers, preferably 0.03 to 0.06 micrometers. The usual amount of coating material is about 0.03 to 0.06 g/m$^2$ of film surface.

As discussed above, the primer layer can be applied to both sides of the polymeric film substrate. If the primer layer is only coated on one side of the polymeric film substrate, the side opposite the primer may be (a) untreated, (b) treated to improve adhesive properties inluding flame treatment or corona discharge, or (c) coated with a functional layer as is known in the art to provide specific end use requirements including heat seal or adhesive properties.

Silicone Release Layer

An advantage of the present invention is that the choice of silicone release material is not limited by the adhesive properties of the film substrate. Accordingly, any of the different types of commercial silicone compositions can be used, with good adhesion to the primer-coated substrate.

The silicone release material can be 100% solid, or solvent or aqueous based. The material can be cured thermally, or by exposure to electron beam or ultraviolet radiation. Reactions to produce the silicone release layer include, but are not limited to: (1) addition reactions between polysiloxanes with pendant vinyl groups and polysiloxanes containing silicon hydrides catalyzed by metals such at Pt or Rh compounds; (2) condensation reactions between silanol-containing polysiloxanes and hydrogen polysiloxanes catalyzed by tin compounds; (3) polysiloxanes with pendant unsaturated groups, such as acrylate or methacrylates, cured through addition reactions initiated by EB, UV, or thermal mechanisms; and (4) polysiloxanes with pendant epoxy groups, such as glycidylmethacrylate, cured through addition reactions where the acid catalyst is generated via UV decomposition of an acid precursor. Suitable silicone materials are commercially available from a number of different suppliers.

The silicone release material can be coated onto the primer-coated film substrate in the form of a solution, dispersion or emulsion, using any conventional coating process. After coating, the compositions can be dried and cured by passing through tunnel ovens heated to about 60°–210° C. for times varying from 2 to 30 seconds. The amount of silicone release material coated depends on the proportion of silicone resin in the coating composition and on the specific release properties desired in the final release film. In general, a dry coating weight of from 0.05 to 10 mg/cm$^2$ is acceptable.

The advantageous properties of this invention can be observed by reference to the following examples which illustrate, but do not limit, the practice of the invention. Unless otherwise stated, all parts and percentages are by weight.

EXAMPLES

GLOSSARY

Crosslinker hexamethoxy melamine formaldehyde resin; Cymel® 301 (American Cyanamid, Wayne, N.J.)

Surfactant I 27.5% aqueous solution of ammonium lauryl sulfate (Standapol® A, Henkel Corporation, Hoboken, N.J.)

Surfactant II 75% active solution of the sodium salt of dioctyl sulfosuccinate; Aerosol® OT-75 (American Cyanamid, Wayne, N.J.)

The following procedure was followed for Example 1 and Comparative Examples 1–3:

A cast polyethylene terephthalate film was stretched in the machine direction and corona treated. An aqueous emulsion of a primer coating was then applied to the film by roller coating. The coating was dried at 70° C. for 4 seconds, and the coated film was further stretched in the transverse direction. The film was subsequently heated at 200° C. for 2 seconds to heat set the polyester and to cure the primer composition. The final coating thickness of the primer layer was 0.035 micrometers; and the final thickness of the film was 1 mil (25 micrometers).

A standard silicone release layer was then applied to the dried primer-coated polyester film substrate. The silicone release layer was cured according to conventional methods.

The adhesion of the silicone release layer to the primer-coated polyester film substrate was determined by rubbing one's fingers across the surface of the release layer while applying moderate pressure. Adhesion was considered to be "good" if the layer was not removed by the rubbing. Adhesion was considered to be "poor" if any of the silicone release layer was removed.

EXAMPLE 1

A primer coating containing a polycarbonate-polysiloxane-polyurethane polymer, which is carboxy-functional, and a crosslinker was prepared by placing the components listed below in a 5 gal. vessel and mixing with a rod until a homogeneous mixture was obtained. The polymer used was Permuthane® UE-41222, supplied by Permuthane Coatings (Peabody, Mass.), as a 30% solids emulsion in water. The primer coating had the following composition:

| Component | Amount (g) |
| --- | --- |
| Polymer | 2826 |
| Crosslinker solution (below) | 225 |
| Water to 11.3 kg | |

The crosslinker solution was prepared from the components listed below.

| Component | Amount (g) |
| --- | --- |
| Crosslinker | 235.5 |
| Surfactant I | 342.5 |
| Surfactant II | 62.8 |
| Ammonium hydroxide | 130 |
| Isopropanol | 942 |
| Ammonium sulfate | 35.3 |
| Water to 2500 g | |

The primer coating was applied to the corona treated polyester substrates and then dried. Samples of the primer-coated polyester substrate were subsequently overcoated with the following silicone release layers:

(A) a solvent based silicone release composition with a Pt catalyst which was heat cured;
(B) a low release commercial silicone release layer which was heat cured;
(C) a high release commercial silicone release layer which was heat cured; and
(D) a high release, high MW commercial silicone release layer which was heat cured.

The adhesion of the silicone release layer to the primer-coated polyester substrate was determined and the results are provided in Table 1 below.

COMPARATIVE EXAMPLE 1

A primer coating was prepared using a polymer which did not contain polysiloxane segments. The polymer used was a copolymer of styrene, butyl acrylate, methyl methacrylate and methacrylic acid which was supplied as a 41.5% solids aqueous emulsion (Rhoplex® WL-81 from Rohm and Haas, Philadelphia, Pa.).

The primer coating had the following composition:

| Component | Amount (g) |
| --- | --- |
| Polymer | 2043 |
| Crosslinker Solution | 225 |
| Water to 11.3 kg | |

The crosslinker solution was the same as that described in Example 1.

The primer coating was applied to a corona treated polyester substrate and then dried. Samples of the primer-coated polyester substrate were subsequently coated with the same silicone release layers described in Example 1. The adhesion of the silicone release layer to the primer-coated polyester substrate was determined and the results are provided in Table 1 below.

COMPARATIVE EXAMPLE 2

A primer coating was prepared using a polymer which did not contain polysiloxane segments. The polymer used was a copolymer of ethylene glycol, isophthalic acid and the sodium salt of 5-sulfoisophthalic acid which was supplied as a 28% solids aqueous solution (AQ 55D from Tennessee Eastman, Kingsport, Tenn.).

The primer coating had the following composition:

| Component | Amount (g) |
| --- | --- |
| Polymer | 3027 |
| Crosslinker Solution | 225 |
| Water to 11.3 kg | |

The crosslinker solution was the same as that described in Example 1.

The primer coating was applied to the corona treated polyester substrates and then dried. Samples of the primer-coated polyester substrate were subsequently coated with the same silicone release layers described in Example 1. The adhesion of the silicone release layer to the primer-coated polyester substrate was determined and the results are provided in Table 1 below.

COMPARATIVE EXAMPLE 3

A primer coating was prepared using a polymer which did not contain polysiloxane segments. The polymer used was a copolymer of methyl methacrylate, ethyl acrylate and methacrylamide supplied as a 46% solids aqueous emulsion. The emulsion contained, on a solids basis, about 25% melamine formaldehyde resin on acrylic resin (Rhoplex® AC201 from Rohm and Haas, Philadelphia, Pa.).

The primer coating had the following composition:

| Component | Amount (g) |
| --- | --- |
| Polymer | 2451 |
| Dimethylamino ethanol | 22.5 |
| Water to 11.3 kg | |

The primer coating was applied to the corona treated polyester substrates and then dried. Samples of the primer-coated polyester substrate were subsequently coated with the same silicone release layers described in Example 1. The adhesion of the silicone release layer to the primer-coated polyester substrate was determined and the results are provided in Table 1 below.

TABLE 1

| Sample | Silicone Release Coating | | | |
| --- | --- | --- | --- | --- |
| | (A) | (B) | (C) | (D) |
| Example 1 | good | good | good | good |
| Comparative Example 1 | poor | poor | poor | poor |
| Comparative Example 2 | poor | good | good | poor |
| Comparative Example 3 | poor | poor | poor | poor |

TABLE 1-continued

| Sample | Silicone Release Coating | | | |
| --- | --- | --- | --- | --- |
| | (A) | (B) | (C) | (D) |
| Uncoated PET | poor | poor | poor | poor |

As shown in Table 1, the adhesion of the silicone release layer was good for each type of silicone resin used in the polymeric release films of Example 1. In contrast, the films of Comparative Examples 1-3 and the uncoated polyethylene terephthalate exhibited poor adhesion.

What is claimed is:

1. A release film comprising in order:
   (A) a dimensionally stable, self supporting polymeric film substrate;
   (B) a layer containing an organic polymer having reactive segments and polysiloxane segments wherein the reactive segments comprise polycarbonate; and
   (C) a silicone release layer consisting essentially of an organopolysiloxane.

2. The release film of claim 1 wherein the organic polymer having reactive segments and polysiloxane segments consists essentially of a polyurethane polymer which is the reaction product of an organic polyisocyanate, a polycarbonate polyol, and an isocyanate-reactive polydialkylsiloxane.

3. A release film comprising in order:
   (A) a dimensionally stable, self supporting polymeric film substrate;
   (B) a layer containing an organic polymer having reactive segments and polysiloxane segments wherein said layer is a thermally hardened layer containing the reaction product of (i) a polyurethane polymer, which is a reaction product of an organic polyisocyanate, a polycarbonate polyol, and an isocyanate reactive polydialkylsiloxane polymer; (ii) a crosslinking agent; and (iii) a catalyst.

4. The release film of claim 3 wherein the crosslinking agent is selected from the group consisting of melamine-formaldehyde resin, urea-formaldehyde resin, benzoguanamine-formaldehyde resin, glycolurilformaldehyde resin, epoxy resin, and aziridine resin.

* * * * *